US00RE48295E

(19) United States
(12) Reissued Patent
Kuisma et al.

(10) Patent Number: US RE48,295 E
(45) Date of Reissued Patent: Nov. 3, 2020

(54) ARRANGEMENT FOR IMPLEMENTING TRANSMISSION OF MULTIMEDIA MESSAGES

(71) Applicant: Conversant Wireless Licensing S.a r.l., Luxembourg (LU)

(72) Inventors: Jussi Kuisma, Tampere (FI); Sisko Pihlajamaki, Tampere (FI)

(73) Assignee: Conversant Wireless Licensing S.a r.l., Luxembourg (LU)

(21) Appl. No.: 13/762,594

(22) Filed: Feb. 8, 2013

Related U.S. Patent Documents

Reissue of:
(64) Patent No.: 7,886,007
Issued: Feb. 8, 2011
Appl. No.: 10/023,447
Filed: Dec. 17, 2001

(30) Foreign Application Priority Data

Dec. 20, 2000 (FI) ..... 20002809

(51) Int. Cl.
*G06F 15/16* (2006.01)
*H04L 12/58* (2006.01)
*H04W 4/12* (2009.01)
*H04W 88/18* (2009.01)

(52) U.S. Cl.
CPC ..... *H04L 51/24* (2013.01); *H04L 51/38* (2013.01); *H04W 4/12* (2013.01); *H04W 88/184* (2013.01)

(58) Field of Classification Search
CPC .. H04M 1/72547; H04M 3/553; H04M 3/537; H04M 3/53333; H04M 3/493; H04M 3/5307; H04L 12/5895; H04L 12/58; H04L 12/589; H04L 12/587; H04L 29/08108; H04L 29/08756; H04W 4/12; H04W 4/14
USPC ..... 709/206–207, 224; 455/412.1, 412.2, 455/414.4, 466; 379/88.12, 88.13, 88.22, 379/88.25
See application file for complete search history.

(56) References Cited

U.S. PATENT DOCUMENTS 5,333,266 A * 7/1994 Boaz et al. ..... 709/206
5,351,235 A * 9/1994 Lahtinen ..... 370/259
5,491,800 A * 2/1996 Goldsmith et al. ..... 709/221
(Continued)

FOREIGN PATENT DOCUMENTS

EP 1138162 B1 6/2000
EP 1138162 10/2001
(Continued)

OTHER PUBLICATIONS

WAP™ MMS Messaging Service, WAP-206-MMS Messaging Service, Draft Version Jun. 1, 2000, Wireless Application Protocol, MMS Messaging Service Specifications, 2000.
(Continued)

*Primary Examiner* — Charles R Craver
(74) *Attorney, Agent, or Firm* — Conversant Wireless Licensing

(57) ABSTRACT

A multimedia messaging center is arranged to receive multimedia messages addressed to a terminal. In response to the receipt of such messages, the message center transmits a notification to the terminal regarding the received message. A wireless message is transmitted, from the terminal to the message center, requesting notification messages that have not been acknowledged as received by the terminal.

20 Claims, 8 Drawing Sheets

(56) References Cited

U.S. PATENT DOCUMENTS 5,550,906 A * 8/1996 Chau et al. ..... 379/201.05
5,555,017 A * 9/1996 Landante et al. ..... 348/14.09
5,706,211 A * 1/1998 Beletic ..... H04W 88/185 340/7.1
5,764,750 A * 6/1998 Chau et al. ..... 379/229
5,966,663 A * 10/1999 Gleason ..... H04L 29/06 455/412.1
5,983,350 A * 11/1999 Minear et al. ..... 713/201
6,021,433 A * 2/2000 Payne et al. ..... 709/219
6,035,104 A * 3/2000 Zahariev ..... 709/203
6,044,402 A * 3/2000 Jacobson et al. ..... 709/225
6,064,671 A * 5/2000 Killian ..... 370/389
6,088,737 A * 7/2000 Yano et al. ..... 709/235
6,115,605 A * 9/2000 Siccardo ..... G08G 1/202 340/7.45
6,119,167 A * 9/2000 Boyle ..... H04L 12/18 709/203
6,130,892 A * 10/2000 Short et al. ..... 370/401
6,147,977 A * 11/2000 Thro et al. ..... 370/265
6,185,603 B1 * 2/2001 Henderson et al. ..... 709/206
6,233,430 B1 * 5/2001 Helferich ..... 455/458
6,310,877 B1 * 10/2001 Rochberger ..... 370/395.2
6,310,889 B1 * 10/2001 Parsons et al. ..... 370/466
6,400,810 B1 * 6/2002 Skladman et al. ..... 379/93.24
6,421,707 B1 * 7/2002 Miller et al. ..... 709/206
6,424,841 B1 * 7/2002 Gustafsson ..... H04W 4/14 455/417
6,452,915 B1 * 9/2002 Jorgensen ..... 370/338
6,501,956 B1 * 12/2002 Weeren et al. ..... 455/463
6,556,997 B1 * 4/2003 Levy ..... 707/10
6,571,275 B1 * 5/2003 Dong et al. ..... 709/209
6,600,732 B1 * 7/2003 Sevanto et al. ..... 370/349
6,647,260 B2 * 11/2003 Dusse et al. ..... 455/419
6,678,361 B2 * 1/2004 Rooke et al. ..... 455/412.1
6,693,652 B1 * 2/2004 Barrus et al. ..... 715/838
6,748,450 B1 * 6/2004 Dutta ..... 709/246
6,785,712 B1 * 8/2004 Hogan et al. ..... 709/206
6,795,711 B1 * 9/2004 Sivula ..... 455/466
6,965,917 B1 * 11/2005 Aloni ..... G06Q 10/107 709/205
7,130,648 B1 * 10/2006 Fournier ..... H04W 8/183 455/414.1
7,240,095 B1 * 7/2007 Lewis ..... G06Q 10/107 379/93.01
7,409,204 B2 * 8/2008 Chaudry ..... H04M 1/7255 455/412.1
7,499,716 B2 * 3/2009 Helferich ..... H04M 1/72547 340/311.2
7,865,904 B2 * 1/2011 McKee ..... G06F 9/542 709/224
2002/0116465 A1 * 8/2002 Kim et al. ..... 709/206
2002/0126708 A1 * 9/2002 Skog et al. ..... 370/351
2003/0023690 A1 * 1/2003 Lohtia ..... H04L 12/587 709/206
2006/0116109 A1 * 6/2006 Lortz ..... H04L 63/08 455/412.2
2006/0161872 A1 * 7/2006 Rytivaara ..... H04L 12/5895 715/864

FOREIGN PATENT DOCUMENTS

WO 9708906 3/1997
WO 0057610 9/2000

OTHER PUBLICATIONS

3GPP TS 23.140 v4.0.0 (Sep. 2000), 3rd Generation Partnership Project; Technical Specification Group Terminals; Multimedia Messaging Service (MMS); Functional Description; Stage 2 (Release 4), 2000.

WAP-209 MMS Encapsulation, WAP MMS Message Encapsulation, Proposed Version Feb. 17, 2000, Wireless Application Protocol, WAP Multimedia Messaging Service Version 1.0, Message Encapsulation, Draft 0.8, 2000.

WAP™ Specification Change Document, WAP-209-MMS Encapsulation, Version Feb. 17, 2000, Wireless Application Protocol, WAP Multimedia Messaging Service, Message Encapsulation, MMS Proposed SCD, Sep. 4, 2000.

3G TS 23.140 v1.0.0 (Dec. 1999), 3rd Generation Partnership Project; Technical Specification Group Terminals; Multimedia Messaging Service (MMS); Functional Description; Stage 2, (3G TS 23.140 version 1.0.0), 1999, pp. 1-26.

"Multimedia Messaging Service for GPRS and UMTS", Sevanto, Wireless Communications and Networking Conference, 1999 IEEE.

"Wireless Application Protocol WAP Multimedia Messaging Service Message Encapsulation MMS Proposed SCD", WAP Specification Change Document, WAP-209-MMSEncapsulation, V. 17, 2000.

* cited by examiner

APPLICATION/VND.MMM.MMS-MESSAGE

MMS HEADERS:

Message Type = m-notific-ind

Transaction-ID =

MMS-Version =

Content Type = multipart mixed

MMS MESSAGE BODY:

NOTIFICATION MESSAGE 1

NOTIFICATION MESSAGE 2

⋮

NOTIFICATION MESSAGE N

Fig. 3b

APPLICATION/VND.MMM.MMS-MESSAGE

MMS HEADERS:

Message Type = m-retrieve-req

Transaction-ID =

MMS-Version =

Content-Location =

Fig. 3c

APPLICATION/VND.MMM.MMS-MESSAGE

MMS HEADERS:

Message Type = m-retrieve-conf

Transaction-ID =

MMS-Version =

Content Type =

MMS MESSAGE BODY:

CONTENT (MULTIMEDIA MESSAGE)

Fig. 3d

ARRANGEMENT FOR IMPLEMENTING TRANSMISSION OF MULTIMEDIA MESSAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue application of U.S. patent application Ser. No. 10/023,447, filed Dec. 17, 2001, now U.S. Pat. No. 7,886,007, issued Feb. 8, 2011, which claims priority from Finnish Patent Application No. 20002809, filed Dec. 20, 2000, the disclosures of which are incorporated by reference in their entirety.*

FIELD OF THE INVENTION

The present invention relates to transferring a multimedia message in a multimedia messaging system.

BACKGROUND OF THE INVENTION

The multimedia messaging service is a communication service under development in which a terminal of a cellular network can send multimedia messages to another terminal. The content of a multimedia message may be e.g. a video clip, an audio clip or a combination of these. The transmission service of multimedia messages in connection with the WAP system (Wireless Application Protocol) is defined in the standard specifications WAP-206MmsMessagingService and WAP-209-MMSEncapsulation. In the third-generation mobile communication networks the multimedia messaging service is to be implemented in a similar manner. In the transmission of a multimedia message the terminal transmits the multimedia message wirelessly to a base station in the cellular network, which forwards the message to a multimedia message service centre MMSC. Having received the multimedia message, the MMSC transmits a notification message to the terminal to which the multimedia message is addressed. Having received the notification message, the terminal software decides whether to fetch the multimedia message. If the terminal (or its user) decides to fetch the multimedia message, the terminal can send a WSP GET request (Wireless Session Protocol) to the MMSC. The MMSC receives this request and transmits the multimedia message in question to the terminal. In a typical case the multimedia message is transmitted to the terminal automatically without user intervention, substantially according to the store-and-forward transmission. The MMSC, however, sends a notification message to the terminal before the multimedia message is transmitted, and the decision on whether to allow transmission of multimedia messages from the MMSC to the terminal is made at the terminal.

In a normal situation the MMSC transmits a notification message to the terminal as soon as a multimedia message addressed to the terminal in question arrives. However, the MMSC may fail to transmit the notification message for several reasons and the terminal may fail to receive it. For example, if the terminal is switched off, it cannot receive notification messages. In addition, the memory of the terminal can be temporarily so full that there is no room for the notification message sent by the MMSC, or an error may occur on the transmission path as a result of which the notification message gets lost on its way to the terminal. It may also happen that the notification message arrives at the terminal, but the terminal cannot interpret it due to an error on the transmission path.

In addition to the above-mentioned reasons, the terminal may fail to receive the notification message because of poor connections. The radio signal that includes the notification message may be too weak when it arrives at the terminal. The battery of the terminal may be so low that the notification message cannot be received. The following situation exemplifies this. The terminal is in standby mode as the notification message arrives at the terminal. The terminal shifts from the standby mode to the reception mode and simultaneously its power consumption increases. Since the battery is, however, almost dead, increase of power consumption switches the terminal off, and thus the terminal cannot receive the notification message.

If the short message service (SMS) is used as the transmission path for the notification message, the terminal may be transmitting several messages and thus it cannot receive the notification, at least not immediately. In the following, we will examine a case in which the terminal is switched off and a validity period of short message is defined (e.g. with parameter MVP, Message validity Period) in the short message service centre SMSC via which the notification message is to be transmitted. The validity period is a predetermined period, e.g. 24 hours. If the validity period of the short message expires, the short message service centre deletes the short message. If the terminal is not switched on before the validity period expires, the terminal does not receive the short message.

SUMMARY OF THE INVENTION

A new invention has now been made. According to a first aspect of the invention there is provided a method of transferring a multimedia message in a multimedia messaging system, which comprises a terminal and a multimedia messaging centre, which are arranged to communicate with each other at least partially wirelessly, the multimedia messaging centre being arranged to receive multimedia messages addressed to the terminal and transmit a notification message to the terminal to inform it of a multimedia message addressed to the terminal which has arrived at the multimedia messaging centre.

The method is characterized by:

transmitting a first message wirelessly to the multimedia messaging centre, the first message requesting the multimedia messaging centre to transmit a notification message to the terminal on the multimedia messages addressed to the terminal which have arrived at the multimedia messaging centre and on which a notification message has not been received by the terminal yet.

According to a second aspect of the invention there is provided a multimedia messaging centre for transferring a multimedia message in a system, which comprises a terminal and a multimedia messaging centre, which are arranged to communicate with each other at least partially wirelessly, the multimedia messaging centre being arranged to received multimedia messages addressed to the terminal and transmit a notification message to the terminal to inform it of a multimedia message addressed to the terminal which has arrived at the multimedia messaging centre.

The multimedia messaging centre is characterized in that it comprises:

means for receiving a first message transmitted by the terminal, the first message requesting the multimedia messaging centre to transmit a notification to the terminal on the multimedia messages addressed to the terminal which have arrived at the multimedia messaging centre and on which the terminal has not received a notification message yet; and means for determining whether there are multimedia messages addressed to the terminal at the multimedia messaging centre on which the terminal has not received a notification message yet.

According to a third aspect of the invention there is provided a terminal which is arranged to function in a system, which comprises a terminal and a multimedia messaging centre, which are arranged to communicate with each other at least partially wirelessly, the multimedia messaging centre being arranged to receive multimedia messages addressed to the terminal and transmit a notification message to the terminal to inform it of a multimedia message addressed to the terminal which has arrived at the multimedia messaging centre.

The terminal is characterized in that it comprises:

means for transmitting a first message wirelessly from the terminal to the multimedia messaging centre, the first message requesting the multimedia messaging centre to send a notification to the terminal on the multimedia messages addressed to the terminal which have arrived at the multimedia messaging centre and on which the terminal has not received a notification message yet.

According to a fourth aspect of the invention there is provided a system for transferring a multimedia message, the system comprising a terminal and a multimedia messaging centre, which are arranged to communicate with each other at least partially wirelessly, the multimedia messaging centre being arranged to receive multimedia messages addressed to the terminal and transmit a notification message to the terminal to inform it of a multimedia message addressed to the terminal which has arrived at the multimedia messaging centre.

The system is characterized in that it comprises:

means for transmitting a first message wirelessly from the terminal to the multimedia messaging centre, the first message requesting the multimedia messaging centre to transmit a notification to the terminal on the multimedia messages addressed to the terminal which have arrived at the multimedia messaging centre and on which the terminal has not received a notification message yet.

The above-mentioned multimedia messaging centre refers to a messaging element which transmits multimedia messages to a terminal and from a terminal. The multimedia messaging centre may be managed by a management unit, e.g. by a suitable server. In that case the first message mentioned in the claims can be transmitted to this server instead of the MMSC. In this application, however, the term multimedia messaging centre is interpreted broadly: for example, in the case of a separate management unit it refers to the entity formed by the above-mentioned server and the MMSC in the multimedia messaging system. The messages sent to the above-mentioned server by the terminal and the messages received by the serves are considered to be received in the multimedia messaging centre.

In the preferred embodiment of the invention the terminal is provided with means for finding out whether the MMSC has multimedia messages which are addressed to the terminal and on which the terminal has not received a notification message from the MMSC (or on which a notification message has not been transmitted successfully to the terminal, even though an attempt has been made). The preferred embodiment also relates to an arrangement in which the terminal can fetch a multimedia message from the MMSC regardless of the lower level protocols used below the multimedia application. This arrangement will consequently function even if the prior art WAP protocol below the application layer in the protocol stack is replaced with another suitable protocol. This embodiment also relates to an arrangement in which radio resources can be saved when notification messages are sent. Since all the notification messages requested by the terminal are sent in one and the same message in the preferred embodiment of the invention, the amount of information transmitted via radio paths decreases.

The first message is preferably sent in a situation in which there is reason to believe that the MMSC may have received multimedia messages addressed to the terminal on which a notification message has not been successfully transmitted to the terminal. Typical situations in which the first message is sent are the following: the terminal has been switched off and is then switched on, the terminal has left the network area and returns to the (coverage) area of the network, or some other situation in which the terminal has been disconnected from the network and reconnects with the network. In these situations the first message is transmitted in response to the terminal being switched on, in response to the terminal returning to the coverage area of the network from an out of coverage area, or in response to the terminal reconnecting to the network.

Even though this description gives us the idea that the terminal independently performs various functions, such as fetches multimedia messages from the MMSC, it is clear that the terminal user can also influence on some of the functions performed by the terminal.

BRIEF DESCRIPTION OF THE DRAWINGS

In the following, the invention will be described in greater detail with reference to the accompanying drawings, in which FIG. 3b illustrates the basic structure of another message according to the preferred embodiment of the invention, FIG. 3c the basic structure of yet another message according to the preferred embodiment of the invention, FIG. 3d illustrates the basic structure of yet another message according to the preferred embodiment of the invention.

DETAILED DESCRIPTION

In a preferred embodiment of the invention the terminal is a wireless terminal, e.g. a mobile station in a cellular network provided with means for communicating wirelessly with the network. The network can be a cellular radio network, such as a third-generation mobile communication network. Information is transmitted between the terminal and a base station of the cellular network via radio paths. There is typically a connection from the base station to the MMSC via a fixed core network. If the WAP technology is used for transmitting information, a WAP gateway is provided between the terminal and the MMSC for converting messages arriving from the terminal into a suitable format for the MMSC. Furthermore, the WAP gateway converts messages sent by the MMSC into a suitable format for the terminal for transmission over the radio path.

In a normal situation, the MMSC sends a notification message to the terminal when a multimedia message addressed to the terminal arrives at the multimedia messaging centre MMSC. The notification message is sent to the terminal to inform it that a multimedia message addressed to it has arrived at the MMSC. The multimedia message is addressed to the user's terminal by means of a certain address, such as the telephone number. This multimedia message can then be fetched by the terminal (or by the user by means of the terminal). As stated above, the terminal may have failed to receive the notification message because, for example, the terminal has been switched off. When the terminal is switched on again, a situation may arise in which the MMSC has a multimedia message intended for the terminal, but the terminal does not know this and thus cannot fetch the message from the MMSC.

Figure 1:
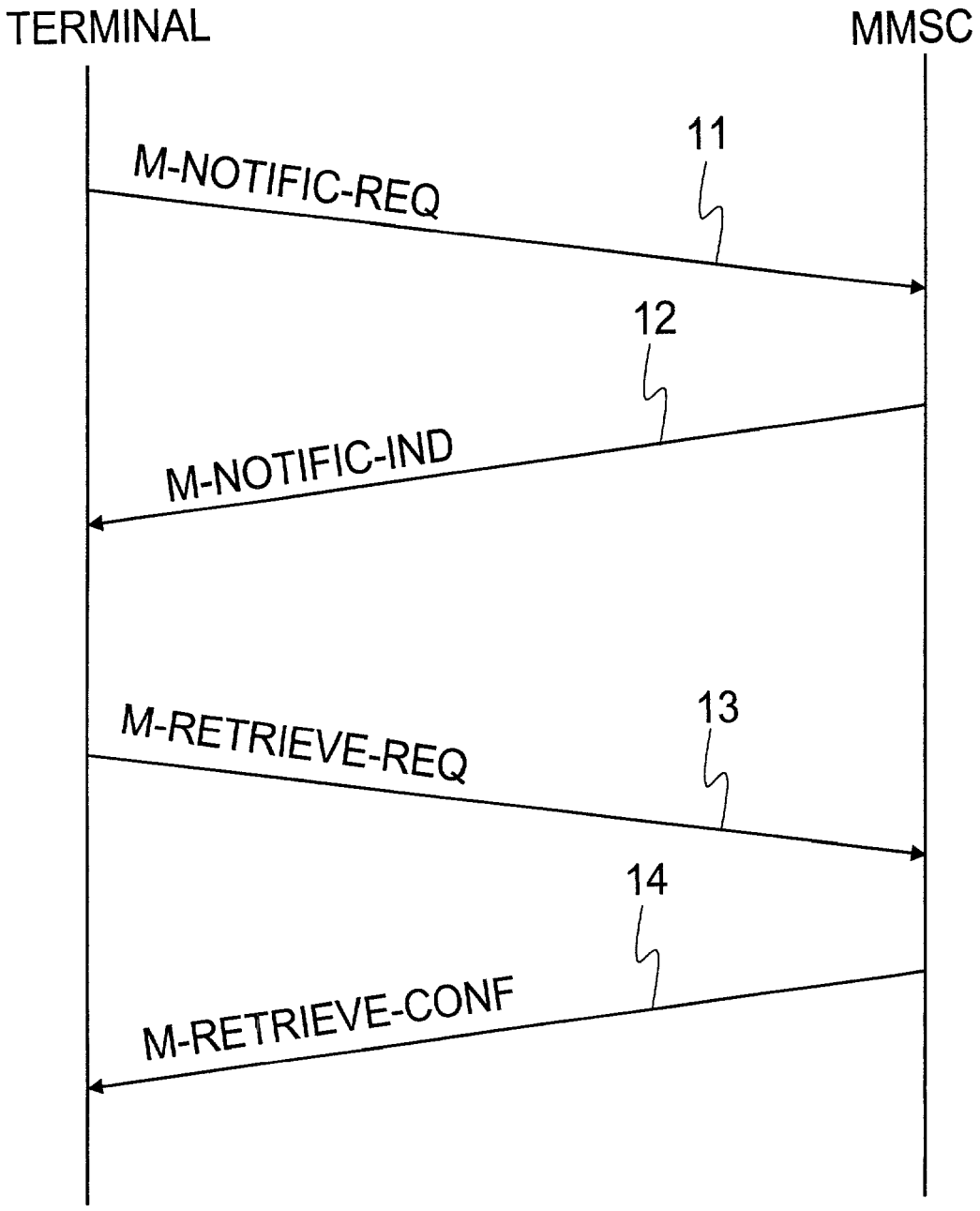
FIG. 1 is a message chart illustrating a method according to the preferred embodiment of the invention.

FIG. 1 is a message chart illustrating a preferred embodiment of the invention. First the terminal sends an inquiry message 11 to the MMSC, requesting the MMSC to send a notification message to the terminal on multimedia messages received by MMSC on which the terminal has not received a notification message from the MMSC.

The term notification message refers to at least two types of notification messages: 1) notification messages the MMSC has sent but the terminal has not received; 2) notification messages the MMSC has not even sent. The MMSC has information on the messages it has sent and received. The information can be maintained e.g. in a suitable database in the MMSC.

Notification messages the MMSC has sent but the terminal has not received mean notification messages which have left the MMSC but which the terminal has not acknowledged. According to the specification WAP-206-MmsMessaging Service, the terminal has to acknowledge a notification message it has received. This can be done e.g. with the message 'm-NotifyResp-req'. According to the specification, the terminal can alternatively fetch the multimedia message on account of which the notification message was sent using a retrieval message (WSP GET request). Thus arrival of a WSP GET request at the MMSC also has to be regarded as an acknowledgement to a notification message. (If the short message service is used as the transmission path for transmitting a notification message, the acknowledgement is carried out at the short message service layer by the message 'delivery ack report' which the device that has received the short message sends to the device that has sent the message.)

Notification messages which the MMSC has not even sent mean notification messages waiting for transmission at the MMSC. These may be e.g. notification messages which have been transferred from the multimedia application to the protocol stack below the application for transmission to the terminal but which have not been sent to the terminal e.g. because a free transmission channel has not been found. It is clear that the terminal cannot have received the messages that have not even been sent, and thus the MMSC cannot have received an acknowledgement to these messages.

Having received the inquiry message 11, the MMSC determines by software whether it has received multimedia messages addressed to the terminal in question on which the terminal has not received a notification message from the MMSC. If the MMSC has not received an acknowledgement to the notification message from the terminal in one form or another, the MMSC concludes that the terminal has not received the notification message in question.

Regardless of whether there are notification messages at the MMSC which have not been transmitted to the terminal, the MMSC responds to the inquiry message 11 with a response message 12. If the MMSC has notification messages for the terminal, these are transmitted in the response message 12. If the MMSC does not have notification messages for the terminal, information that there are no notification messages is attached to the response message 12.

When the terminal receives the response message 12, it can conclude from the information included in the response message 12 what kind of multimedia messages the MMSC has and fetch one or more multimedia messages from the MMSC. 65 In a preferred embodiment of the invention the terminal automatically fetches a multimedia message corresponding to the information included in the response message 12 without user intervention using a retrieval message 13. Now the terminal sends a retrieval message 13 to the MMSC indicating that it wants to fetch a multimedia message. The MMSC receives the retrieval message 13. In response to the retrieval message 13, the MMSC sends the multimedia message to the terminal in message 14, which can be called e.g. the retrieval response message here.

At the multimedia application level each message 11 to 14 has a certain message type. The transmitting device inserts the message type into a certain header field in the message 11 to 14. From the message type the device receiving the message 11 to 14 knows how to process the message 11 to 14, e.g. how the binary encoded parts of the message should be decoded. The information on how each message type should be processed is included in a program code which is stored in advance in the terminal and in a program code which is stored in the MMSC. In a preferred embodiment of the invention the message type of the inquiry message 11 is 'm-notific-req', that of the response message 12 'm-notific-ind', that of the retrieval message 13 'm-retrieve-req', and that of the retrieval response message 14 'm-retrieve-conf'. Other titles can also be used for the different message types. The main point is that the transmitter of the message 11 to 14 and the receiver understand each other so that the same message type means the same thing both at the transmitting and at the receiving end.

Figure 2:
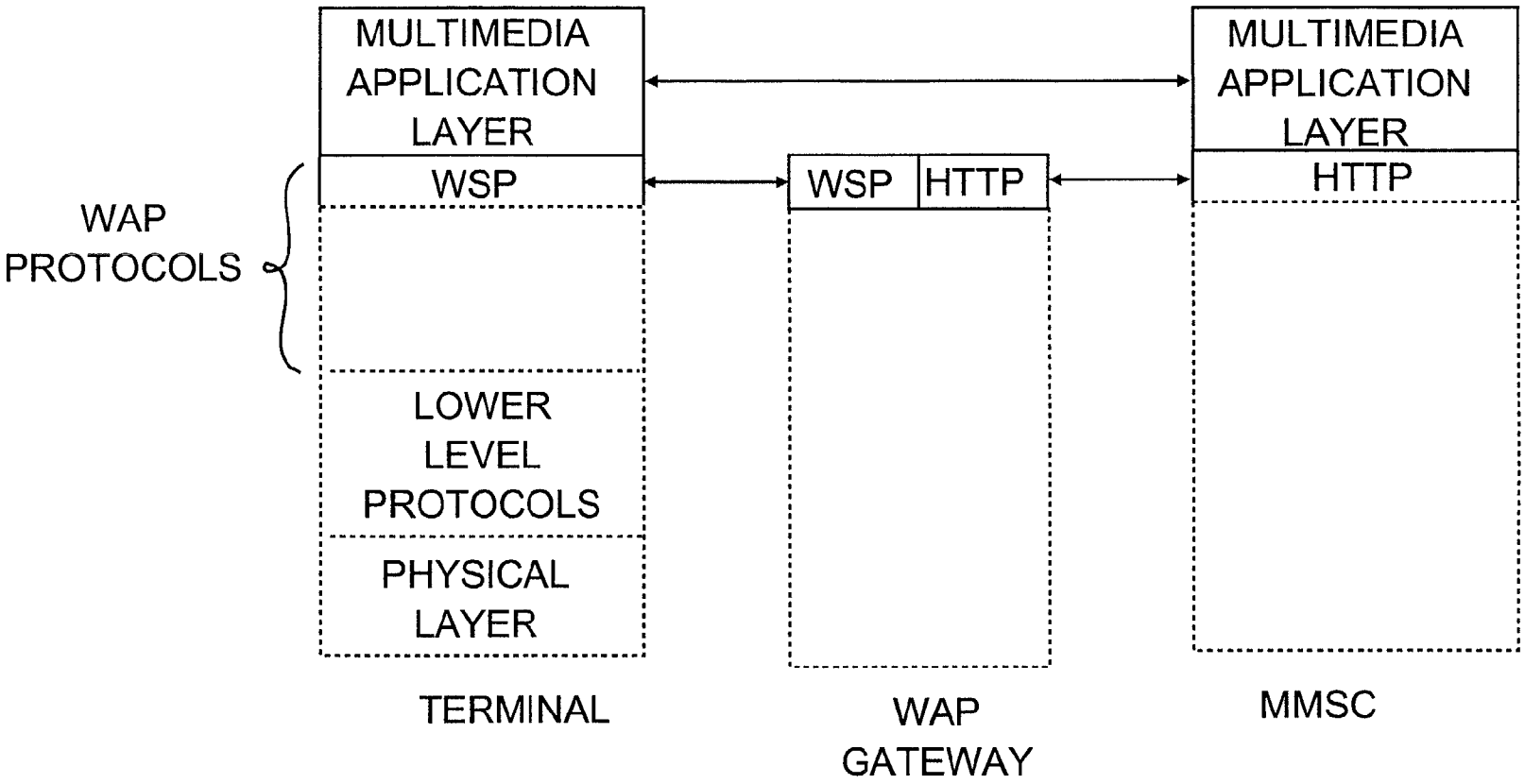
FIG. 2 is a simplified illustration of protocol layers of a terminal and a network.

FIG. 2 is a simplified illustration of protocol layers of the terminal and the network. If the system is implemented using the WAP technology, a WAP gateway is provided between the terminal and the MMSC, as stated above. The WAP gateway converts messages from the terminal into a suitable format for the MMSC. The WAP gateway performs a conversion between the WAP WSP protocol (Wireless Session Protocol) and the HTTP protocol (HyperText Transfer Protocol), for example. Furthermore, the WAP gateway converts the messages transmitted to the terminal by the MMSC into a suitable format for the terminal for transmission over the radio path. The WAP gateway and the MMSC are located in the network.

The actual multimedia application for implementing multimedia messaging is placed on top of the uppermost protocol layer in the terminal. Below the multimedia application level there may be WAP protocols, below which there are lower-level protocols, which may include an IP protocol (Internet Protocol), for example. The lowest protocol layer is typically called the physical layer. The physical layer is responsible for concrete transmission and reception of messages. When the WAP technology is used, the WAP WSP layer is typically the topmost protocol layer in the terminal. The network contains corresponding protocol layers.

All messages 11 to 14 are sent at the multimedia application level. This means that a message structure and a message type are defined for all messages 11 to 14 at the multimedia application level. At the multimedia application level the message structure contains multimedia application-specific header fields and a message body, where the actual message content is carried, provided that the message has a content. The message type appears from a certain header field. As stated above, the multimedia application receiving the message knows from the message type how to process the message concerned. The structure of the messages 11 to 14 will be described more closely in connection with FIGS. 3a to 3d.

Since all messages 11 to 14 are sent at the multimedia application level, the implementation of the multimedia messaging service is independent of the protocols used below the multimedia application. For example, the implementation suggested in the existing standard specification is dependent on the WAP technology because, according to the specification, the WAP WSP GET message is used for fetching a multimedia message. The preferred embodiment of the invention does not comprise such a limitation. Since in the preferred embodiment of the invention the retrieval message 13 has a message structure and a message type at the multimedia application level, the method of the preferred embodiment of the invention will function even if the WAP protocols are replaced with some other protocols.

The messages 11 to 14 are encapsulated for transmission. At the transmitting end the messages 11 to 14 travel downwards from the multimedia application level in the protocol stack until they reach the physical layer which sends the message. As the message travels from one protocol layer to a lower protocol layer, the lower protocol layer provides the message with its header fields and inserts the whole message received from an upper protocol layer into the message body.

Figure 7:
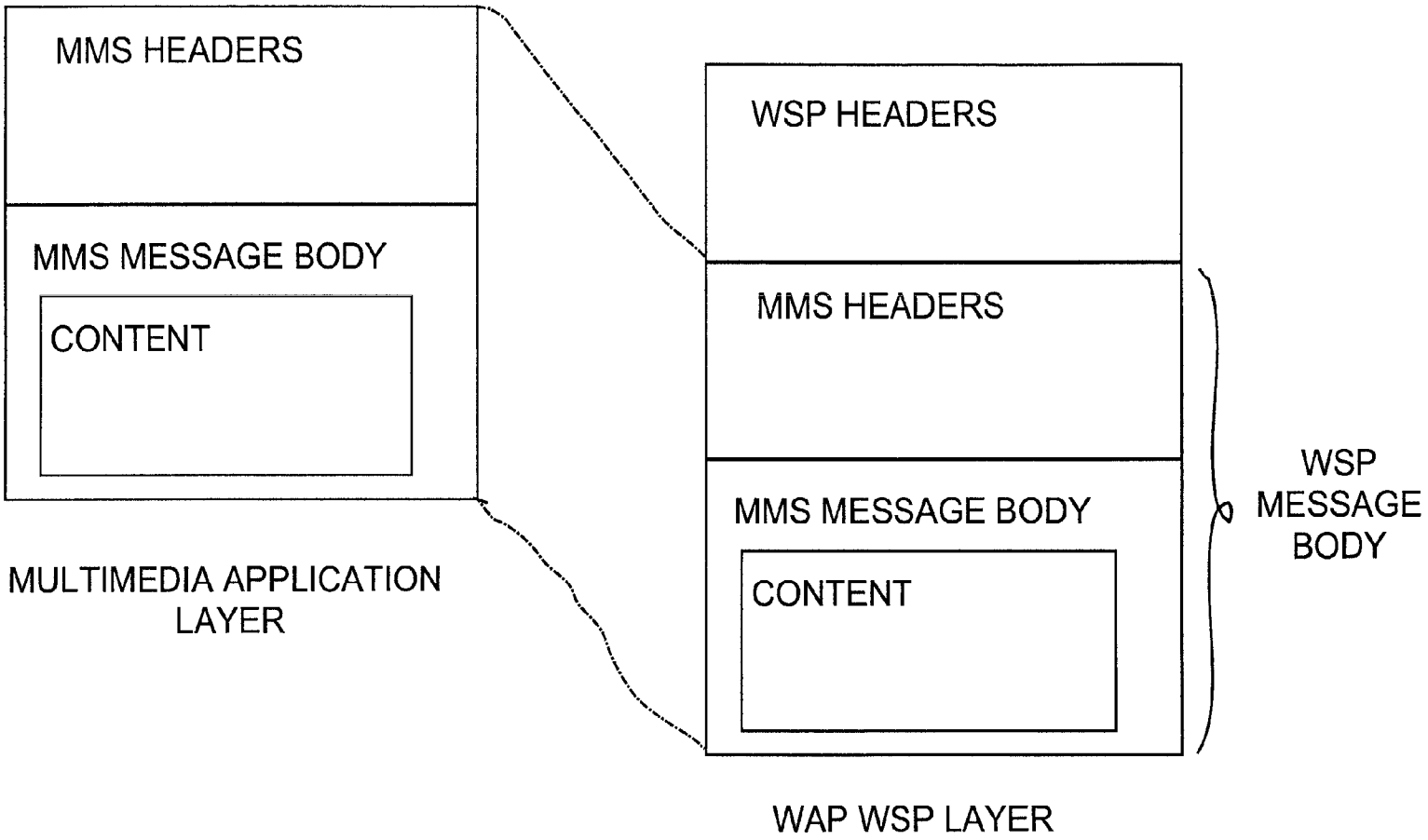
FIG. 7 illustrates message encapsulation in protocol stacks.

FIG. 7 describes a general case of how messages travel from the multimedia application level to the protocol layer just below it. (The messages travel in a corresponding manner from the multimedia application level to the protocol layer below it in the MMSC.) The example shown in FIG. 7 is related to a case in which the protocol layer just below the application layer in the protocol stack is the WAP WSP layer. The actual protocol stack is not shown in FIG. 7, but it mainly illustrates message encapsulation in the protocol stack. At the multimedia application level the message to be sent from the terminal comprises header fields (MMS headers; Multimedia Messaging Service) and a message body (MMS message body). The header fields are multimedia messaging service-specific. The actual content of the message is transmitted in the message body.

At the WSP layer the message to be sent also comprises header fields (WSP headers) and a message body (WSP message body). In this case, however, the header fields are not multimedia messaging service-specific header fields, but WSP layer-specific header fields that have been added by the WSP layer. The header fields and the message body (if any included in the message) of the multimedia application level are encapsulated in the WSP message body.

As the message travels downwards in the protocol stack, the protocol layers provide the message with header fields of their own, which are typically needed in the transmission of the message from the transmitter to the receiver. At the receiving end the message travels in the protocol stack from below upwards. The protocol layers remove the headers the corresponding protocol layer at the transmitting end has added. A certain header field at each protocol layer indicates the content type of the message body used at each protocol layer. If, for example, there is a WAP WSP layer just below the application layer, the content of the WSP message body is indicated in the WSP header field 'content type'. In the preferred embodiment of the invention, the content type defined for messages intended for the multimedia application is 'application/vnd.mmm.mms-message'. The definition is stored in advance in the terminal and the MMSC. The content type in question can also be named otherwise. The main point is that the transmitter and the receiver of the message understand each other, i.e. the same content type means the same thing both at the transmitting and at the receiving end. On the basis of the content type the terminal (or the MMSC) transfers the received message upwards in the protocol stack to the correct application of the application layer, i.e. to the multimedia application in this case.

FIGS. 3a to 3d illustrate the basic structure of the messages 11 to 14 in greater detail. The terminal sends an inquiry message 11 to the MMSC. The message 11 requests the MMSC to transmit notification messages to the terminal as explained above. The basic structure of the message 11 (FIG. 3a) comprises only headers (MMS headers) at the multimedia application level. These are multimedia messaging service-specific headers which have been binary encoded. The header field 'message type' indicates the message type of the message 11 in question, which is 'm-notific-req'. When the MMSC receives the message 11 with the message type 'm-notific-req' from the terminal, it knows that the terminal wants it to send notification messages to the terminal. Depending on the application, the message 11 also contains other header fields. The header field 'transaction-ID' is provided with an identifier on the basis of which the message and the response to the message are linked with each other in the terminal and the MMSC. The step 'MMS version' indicates the version number (e.g. version 1.0) of the multimedia messaging service. The message 11 can contain the header field 'From-date-and-time' or another header field, which gives further information to the MMSC. In the field 'From-date-to-time' the MMSC can be informed of the moment from which on the terminal wants to receive undelivered notification messages. This information can be defined by the user himself or it can be fetched from the terminal's memory, in which it has been stored in advance. The information may have been stored e.g. in a certain log file when the terminal was used for communication, such as a speech call, for the last time.

The basic structure of the response message 12 sent in response to the inquiry message 11 is illustrated in FIG. 3b. In the common case, the response message 12 contains headers (MMS headers) and a message body at the multimedia application level. The header fields have been binary encoded. The header field 'message type' indicates the message type of the message 12, which is 'm-notific-ind'. When the terminal receives a message 12 with the message type 'm-notific-ind' from the MMSC, it knows that the message may contain notification messages. Depending on the application, the message 12 also contains other header fields. The header field 'content type' indicates the content of the message body. The notification messages requested by the terminal in message 11 are transmitted in the message body of message 12. If there are more than one notification message, the content type is 'multipart mixed'. If there is only one notification message, the prior art notification message can be used. Each notification message constitutes a separate content in the message body. The header field 'transaction-ID' is provided with an identifier on the basis of which the message and the response to the message are linked with each other in the terminal and the MMSC. For example, if there was number 3 in the header field 'transaction-ID' of message 11, in the message 12 transmitted in response to the message 11 the header field 'transaction-ID' will also include the same identifier, i.e. number 3. The header field 'MMS version' indicates the version number of the multimedia messaging service.

Figure 4:
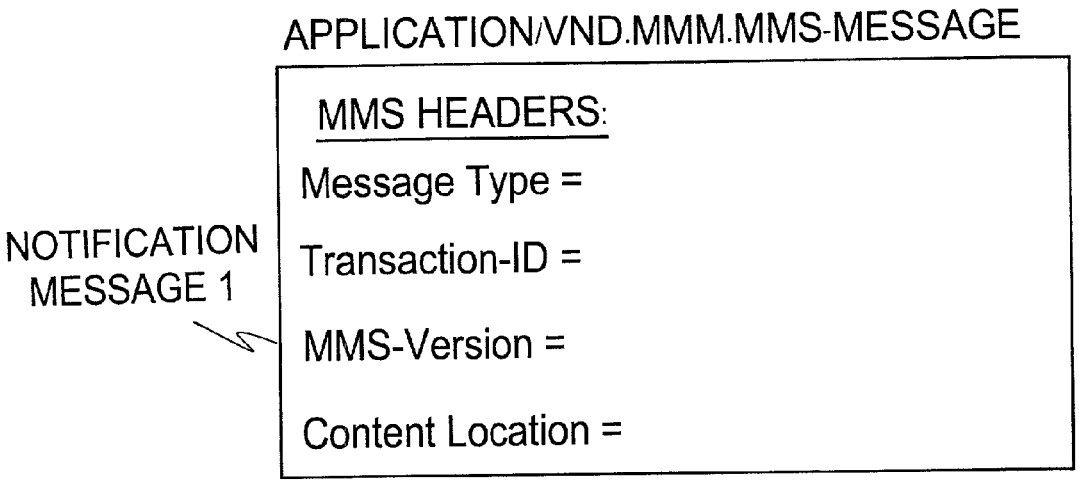
FIG. 4 illustrates a detail of the message shown in FIG. 3b.
Figure 3A:
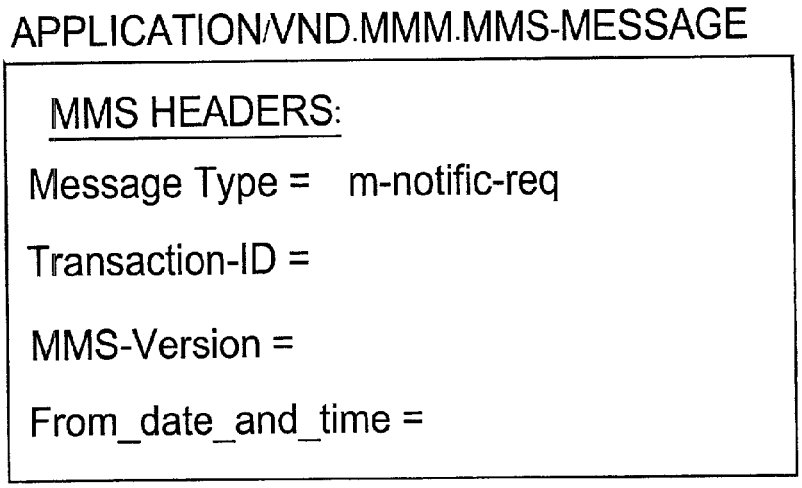
FIG. 3a illustrates the basic structure of a message according to the preferred embodiment of the invention.

FIG. 4 illustrates the basic structure of the notification message included in the message body of the response message 12. The basic structure of the notification message is known per se from the standard specification WAP-209-MMSEncapsulation, and it includes only header fields (MMS headers). The header fields have been binary encoded. The header field 'message type' indicates the message type of the notification message, which is e.g. 'm-notification-ind'. From the message type 'm-notification-ind' the terminal knows that it should process the notification message as a notification message. Depending on the application, the notification message also contains other header fields. The header field 'transaction-ID' is provided with an identifier on the basis of which the message and the response to the message are linked with each other in the terminal and the MMSC. The header field 'MMS version' indicates the version number of the multimedia messaging service. The header field 'content location' indicates the location of the retrievable multimedia message from which the terminal can load the multimedia message or its component. The location is preferably indicated by means of a URI (Uniform Resource Identifier). Some other identifier can also be used, e.g. an identifier defined by the MMSC, on the basis of which the MMSC recognizes the multimedia message to be fetched as the terminal requests loading. The content type of each multimedia message is 'application/vnd.mmm.mms-message'. This forms a recursive structure where the content type of the response message 12 is the same as the content type of the notification message 12 included in the response message.

We will now return to FIG. 3b. If there were no notification messages for the terminal, the response message 12 will not contain any message body but only header fields. In that case the header field 'content type' of the response message 12 contains a value which tells the terminal that there were no notification messages. The header field 'content type' may also be omitted altogether, which tells the terminal that there were no notification messages. Alternatively, several telephone numbers can be defined for the MMSC. Depending on the telephone number from which the response message arrives at the terminal, the terminal concludes whether there were notification messages or not. For example, if the response message 12 arrives from a first telephone number defined for the MMSC, the terminal concludes that there were notification messages (the notification messages are included in the response message). If the response message 12 arrives from a second telephone number defined for the MMSC, the terminal concludes that there were no notification messages.

The basic structure of the retrieval message 13 used for fetching multimedia messages is illustrated in FIG. 3c. At the multimedia application level the basic structure of the retrieval message 13 comprises only header fields (MMS headers). The header fields have been binary encoded. The header field 'message type' indicates the message type of the retrieval message 13, which is m-retrieve-req. When the MMSC received the retrieval message 13 with the message type 'm-retrieve-req' from the terminal, it knows that the message should be processed as a retrieval message. Depending on the application, the retrieval message 13 also contains other header fields. The header field 'content location' indicates the location of the multimedia message (content) from where the multimedia message can be fetched. The location of the multimedia message has been supplied to the terminal earlier in the response message 12 as the URI or as an identifier defined by the MMSC in the header field 'location content' of the notification message (or in a corresponding header field) from which the terminal copies the location information into the corresponding header field of the retrieval message 13. The header field 'transaction-ID' is provided with an identifier on the basis of which the message and the response to the message are linked with each other in the terminal and the MMSC. The header field 'MMS version' indicates the version number of the multimedia messaging service.

The multimedia message the retrieval of which the terminal has requested in the retrieval message 13 is sent to the terminal in a retrieval response message 14. FIG. 3d illustrates the basic structure of the retrieval response message 14. The retrieval response message 14 is known per se from the standard specification WAP-209-MMSEncapsulation and at the multimedia application level it comprises both header fields (MMS headers) and a message body (MMS message body). The header fields have been binary encoded. The header field 'message type' indicates the message type of the retrieval response message 14, which is 'm-retrieve-conf'. When the terminal receives the retrieval response message 14 with the message type 'm-retrieve-conf' from the MMSC, it knows that the retrieval response message 14 should be processed as a response to the retrieval message 13. Depending on the application, the retrieval response message 14 also contains other header fields. The header field 'transaction-ID' is provided with an identifier on the basis of which the message and the response to the message are linked with each other in the terminal and the MMSC. For example, if there was number 4 in the header field 'transaction-ID' of the retrieval message 13, the header field 'transaction-ID' of the retrieval response message 14 sent in response to the retrieval message also includes the same identifier, i.e. number 4. The header field 'MMS version' indicates the version number of the multimedia messaging service. The multimedia message requested in the retrieval message 13 is included in the message body of the retrieval response message 14. The type of the multimedia message is indicated in the header field 'content type'.

Figure 5:
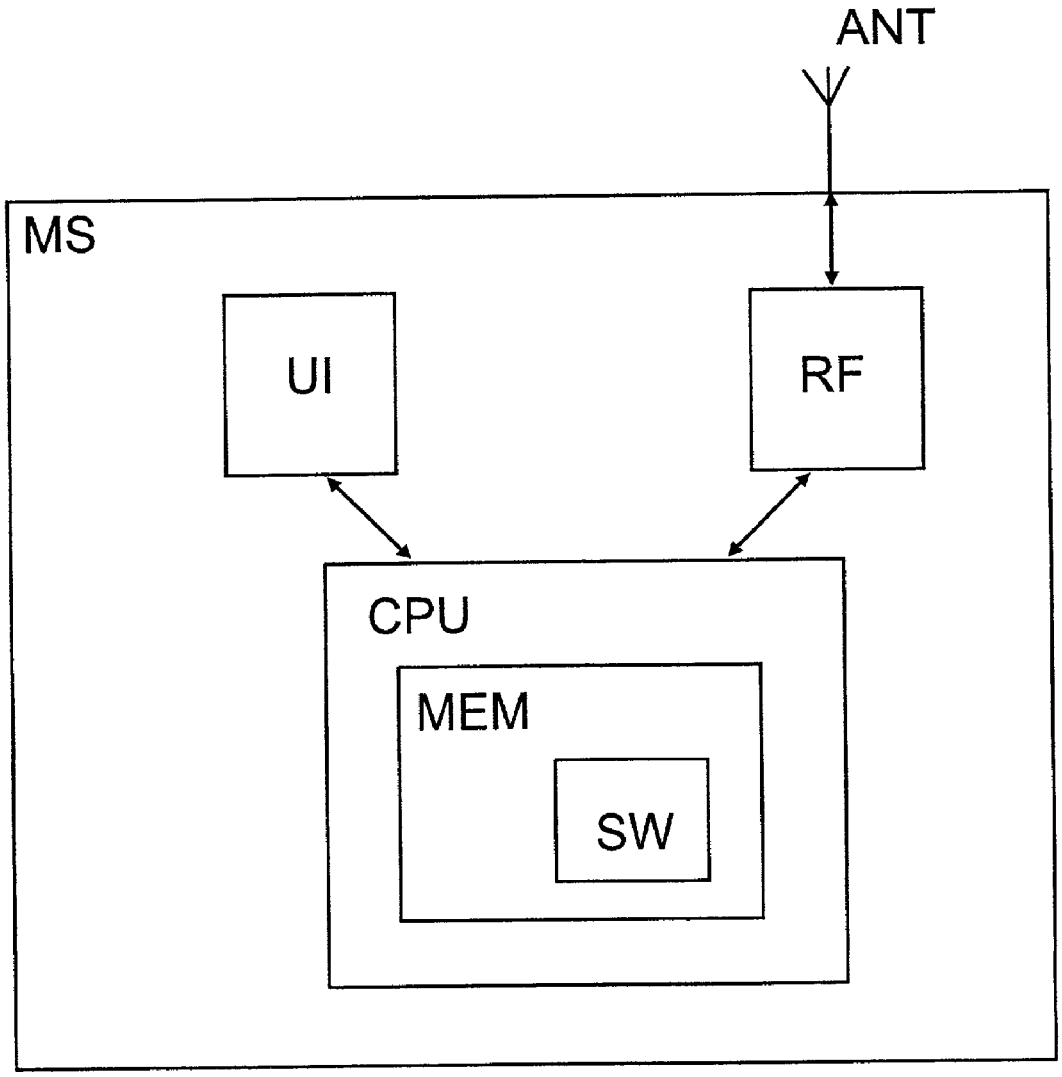
FIG. 5 illustrates a terminal suitable for implementing the invention.

The main parts of the invention are implemented by software in the MMSC and the terminal. FIG. 5 illustrates a mobile station of a cellular network suitable for use as a terminal in the preferred embodiment of the invention. The mobile station comprises processing means CPU, a radio-frequency transceiver RF and a user interface UI. The transceiver RF and the user interface UI are connected to the processing means CPU. The user interface UI provides means for using the mobile station. The processing means CPU comprise a microprocessor (not shown in FIG. 5), memory MEM and software SW. The software SW is stored in the memory MEM. The part of the software SW that implements processing of messages related to multimedia messaging in the terminal according to the invention is called a multimedia application. The microprocessor uses the software SW to control the function of the mobile station, such as use of the transceiver RF, display of information by means of the user interface UI and reading of the inputs received from the user interface UI. In accordance with the software SW, the microprocessor generates messages 11 and 13, which the transceiver RF sends via its antenna ANT wirelessly to the base station of the cellular network, which forwards the messages to the MMSC. The microprocessor CPU handles the messages 12 and 14 which have been transmitted by the MMSC and which the transceiver RF receives via its antenna ANT from the base station of the cellular network.

Figure 6:
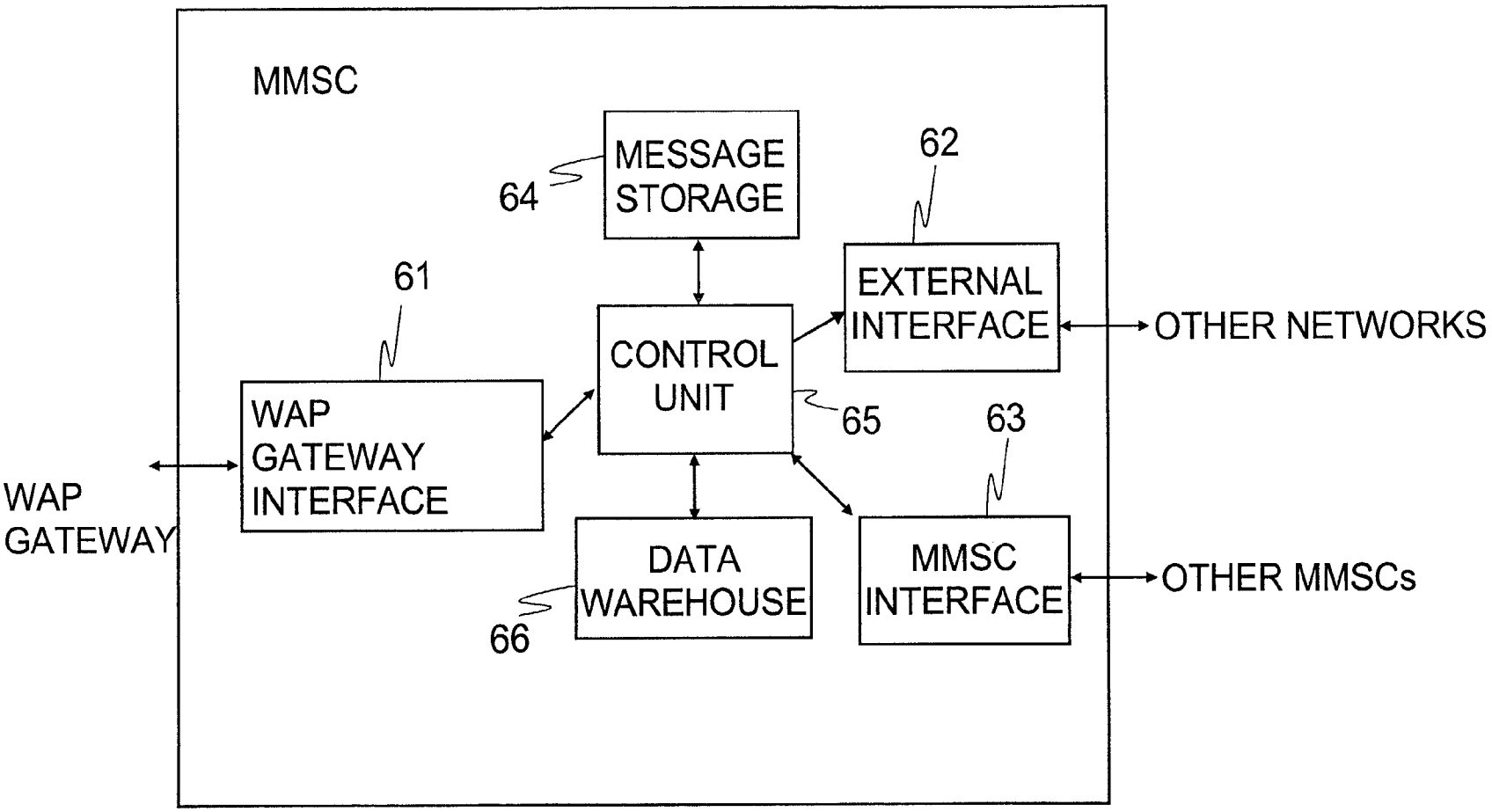
FIG. 6 illustrates a multimedia messaging centre suitable for implementing the invention.

FIG. 6 illustrates the basic structure of the MMSC suitable for the invention. The MMSC comprises a WAP gateway interface 61, via which the MMSC communicates with the WAP gateway and the terminal. Communication to external networks, such as the Internet network, is carried out via an external interface 62, and via an MMSC interface 63 to other multimedia messaging centres. A message storage 64 is a memory area/means in which multimedia messages are stored. A data warehouse 66 is a memory area/means in which information on the multimedia messages are stored. Information on messages transmitted and received by the MMSC, such as notification messages and acknowledgements (if any) to them, is also stored in the data warehouse. The data warehouse 66 can be implemented as a database structure. In the method according to a preferred embodiment of the invention the MMSC compares the above-mentioned data to find out whether there are multimedia messages at the MMSC which the terminal has not received. In an alternative embodiment the MMSC finds out the same by investigating whether its transmission buffer (not shown) contains notification messages for the terminal in question (waiting for a transmission in the future).

The control unit 65 is connected to the WAP gateway interface 61, the external interface 62, the MMSC interface 63, the message storage 64 and the data warehouse 66. The control unit 65 comprises a processing unit, such as a processor, and a program by means of which it controls the function of the MMSC. The part of the program that implements the multimedia messaging service in the MMSC is called the multimedia application. (The fact that the application related to the implementation of the invention is called the same both in the terminal and in the MMSC does not mean that they are identical.) It is clear to a person skilled in the art that the MMSC may also comprise other blocks related to authentication and maintenance of the MMSC, for example.

Multimedia messages addressed to the terminal arrive at the MMSC via one of its interfaces (61 to 63) and they are stored in the message storage 64 at the command of the control unit 65. The data on the messages, such as time of arrival and identification data (e.g. URI, or an identifier defined by the MMSC, if the MMSC has defined one) are stored in the data warehouse 66. The message 11 transmitted by the terminal is received via the WAP gateway interface 61. The processor of the control unit processes the message 11 on the basis of the multimedia application. The control unit generates notification messages on the basis of the data included in the data warehouse 66 and inserts them into the message body of the message 12. The message 12 is transmitted to the WAP gateway (and via the gateway further to a base station of the cellular network and to the terminal) via the WAP gateway interface 61. The message 13 from the terminal is received via the WAP gateway interface 61. The processor of the control unit processes the message 13. On the basis of the data obtained from the data warehouse 66 the control unit transfers the multimedia message from the message storage 64 into the message body of the message 14 for transmission to the terminal. The message 14 is transmitted to the WAP gateway (and further to a base station of the cellular network and to the terminal) via the WAP gateway interface at the command of the WAP gateway interface.

The preferred embodiment of the invention provides a solution by means of which the terminal can find out whether multimedia messages on which it has not received a notification message have arrived at the MMSC. If there are several multimedia messages, they all are preferably transmitted in the same short message or in the same message over a packet-switched connection (e.g. a GPRS connection; General Packet Radio Service), which saves radio resources compared to the prior art solution in which all notification messages are transmitted as separate short messages.

A further advantage of the invention is that the terminal can directly ask the MMSC whether it has notification messages for the terminal, and thus the MMSC sends the notification messages to the terminal immediately. Even if the system is provided with a retransmission mechanism for retransmitting unacknowledged notification messages, the terminal will not have to wait for retransmission of notification messages which it has not received for one reason or another.

The implementation and embodiments of the invention have been described by means of examples above. It is obvious to a person skilled in the art that the invention is not limited to the details of the embodiments described above and the invention can be implemented otherwise without deviating from the characteristics of the invention. The above embodiments should be regarded as illustrative but not as restrictive. Thus the embodiments and applications of the invention are limited only by the appended claims. The alternative embodiments of the invention defined in the claims, including equivalent embodiments, fall within the scope of the invention.

The invention claimed is:

1. A method comprising:

transmitting a first message wirelessly to a multimedia messaging centre, the first message requesting the multimedia messaging centre to transmit a notification message to a terminal only for multimedia messages addressed to the terminal [that have arrived at the multimedia messaging centre and] for which [the terminal has not received] a notification message [yet] *has not been sent*, and only for multimedia messages for which a notification message has been sent and an acknowledgement message from the terminal has not yet been received by the multimedia messaging center, wherein said first message comprises an option to define a selection criterion so as to limit information to be sent in response to said first message; and sending the notification message to the terminal, wherein the notification message is a message to which a response is *to be* sent from the terminal for receiving the actual multimedia message.

2. A method according to claim 1, wherein said [first message requests the multimedia messaging centre to transmit a notification message to the terminal for multimedia messages, addressed to the terminal, that have arrived at the multimedia messaging centre and for which the terminal has not received a notification message transmitted from the multimedia messaging centre] *selection criterion includes a time from which the terminal requests to receive undelivered notification messages*.

3. A method according to claim 1, wherein the method further comprises:

receiving the first message transmitted by the terminal at the multimedia messaging centre;

determining at the multimedia messaging centre whether there are multimedia messages addressed to the terminal at the multimedia messaging centre for which the terminal has not received a notification message yet;

transmitting a second message from the multimedia messaging centre to the terminal in response to the first message, the second message containing the notification messages for said multimedia messages for which the terminal has not received a notification message yet.

4. A method according to claim 3, wherein the method further comprises:

receiving the second message at the terminal, which has been transmitted by the multimedia messaging service and contains said notification messages; *and* transmitting a third message from the terminal to the multimedia messaging centre in response to said second message, the third message indicating to the multimedia messaging centre the terminal's desire to fetch the multimedia message on which a notification message was transmitted to the terminal in said second message.

5. A method according to claim 3, wherein [it is determined] *determining*, at the multimedia messaging centre, whether the multimedia messaging centre has multimedia messages, addressed to the terminal, for which the terminal has not received a notification message[, by] *comprises* investigating whether the multimedia messaging centre has received an acknowledgement to the notification message from the terminal.

6. The method of claim 3 [further comprising that] *wherein* the first message indicates to the multimedia messaging centre a time when the terminal wants to receive the undelivered notification messages.

7. A method according to claim 4, wherein the method further comprises:

receiving the third message transmitted by the terminal at the multimedia messaging centre; *and* transmitting a fourth message from the multimedia messaging centre to the terminal in response to said third message, the fourth message containing the multimedia message which the terminal desires to fetch as indicated in said third message.

8. The method of claim 4 [further comprising that] *wherein* each of the first, second, third and fourth messages are a certain message type, the message type indicating to a receiving device how to process a respective message.

9. A method according to claim 7, wherein the terminal and the multimedia messaging centre comprise a protocol stack and a multimedia application on top of it, and said first, second, third and fourth messages are transmitted at the level of the multimedia application, the messages then being independent of the implementation of the protocol stack below the multimedia application.

10. A method according to claim 1, wherein the selection criterion defines that notification message(s) for only those multimedia messages for which notification message(s) has not been successfully transmitted are requested.

11. A multimedia messaging centre comprising:

[an] *a transmitting and receiving* interface configured for receiving a first message requesting the multimedia messaging centre to transmit a notification message to [a] *the* terminal only for multimedia messages addressed to the terminal [that have arrived at the multimedia messaging centre and] for which [the terminal has not received] a notification message [yet] *has not been sent* and only for multimedia messages for which a notification message has been sent to the terminal but for which an acknowledgement has not been received in the multimedia messaging centre; and a control unit *comprising a processing unit,* configured for determining whether there are multimedia messages[.] addressed to the terminal at the multimedia messaging centre for which the terminal has not received a notification message yet, and multimedia messages for which a notification message has been sent to the terminal but for which an acknowledgement has not been received in the multimedia messaging centre, where the notification message is a message to which a response is *to be* sent from the terminal for receiving the actual multimedia message.

12. A multimedia messaging centre according to claim 11, wherein said first message comprises an option to define a selection criterion so as to limit information to be sent in response to said first message, and wherein the multimedia messaging centre is arranged to select information to be sent in return based on said selection criterion.

13. A multimedia messaging centre according to claim 12, wherein the selection criterion is definable so that said first message requests notification message(s) to be sent concerning only those multimedia messages for which notification message(s) has not been successfully transmitted, and wherein the multimedia messaging centre is arranged to handle and respond to said first message containing the selection criterion defined this way.

14. An apparatus comprising:

a processor;

a memory including computer program code, the memory and the computer program code configured to, with the processor, cause the apparatus at least to:

transmit a first message wirelessly to a multimedia messaging centre, the first message requesting the multimedia messaging centre to transmit a notification message to the apparatus only for multimedia messages addressed to the apparatus [that have arrived at the multimedia messaging centre and] for which [the apparatus has not received] a notification message [yet] *has not been sent* and only for multimedia messages for which a notification message has been sent but for which an acknowledgement has not yet been received in the multimedia messaging centre, wherein said first message comprises an option to define a selection criterion so as to limit information to be sent in response to said first message and the notification message is a message to which a response is *to be* sent from the apparatus for receiving the actual multimedia message.

15. A terminal according to claim 14, wherein the terminal is arranged to request, with said first message and using said selection criterion, notification messages concerning only those multimedia messages for which notification messages has not been successfully transmitted.

16. A system comprising:

[means] *a transceiver* for transmitting a first message[,] wirelessly from a terminal to a multimedia messaging centre, the first message requesting the multimedia messaging centre to transmit a notification message to the terminal only for multimedia messages addressed to the terminal [that have arrived at the multimedia messaging centre, and] for which [the terminal has not received] a notification message [yet] *has not been sent* and only for multimedia messages for which a notification message has been sent but for which an acknowledgement has not yet been received in the multimedia messaging centre, wherein said first message comprises an option to define a selection criterion so as to limit information to be sent in response to said first message and the notification message is a message to which a response is *to be* sent from the terminal for receiving the [actual] multimedia message.

17. A [computer program product stored in a] *non-transitory* memory [and executable] *storing computer program code, that when executed* by a computer, *causes* the computer [program product comprising] *to*:

[computer readable program code means for causing the computer to] receive a first message requesting the computer to transmit a notification message to a terminal only for multimedia messages addressed to the terminal [which have arrived at the computer and on which the terminal has not received] *for which* a notification message [yet] *has not been sent* and only for multimedia messages for which a notification message has been sent but for which an acknowledgement has not yet been received by the computer, where the notification message is a message to which a response is *to be* sent from the terminal for receiving the actual multimedia message; and

[computer readable program code means for causing the computer to] determine whether there are multimedia messages addressed to the terminal at the computer on which the terminal has not received a notification message yet, and multimedia messages for which a notification message has been sent to the terminal but for which an acknowledgement has not been received by the computer.

18. The [computer program product] *non-transitory memory* according to claim 17, wherein said first message comprises an option to define a selection criterion so as to limit information to be sent in response to said first message, and wherein the computer program [product has computer readable program code means for selecting] *code, when executed by the computer, causes the computer to select* information to be sent in return based on said selection criterion.

19. A [computer program product stored in a] *non-transitory* memory [and executable] *storing computer program code, that when executed by a processor* in a terminal, [the computer program product comprising] *causes the terminal to*:

[computer readable program code means for causing the terminal to] transmit a first message wirelessly from the terminal to a multimedia messaging centre, the first message requesting the multimedia messaging centre to transmit a notification message to the terminal only for multimedia messages [addressed to the terminal which have arrived at the multimedia messaging centre and on which the terminal has not received] *for which* a notification message [yet] *has not been sent* and only for multimedia messages for which a notification message has been sent but for which an acknowledgement has not yet been received in the multimedia messaging centre, where the notification message is a message to which a response is *to be* sent from the terminal for receiving the actual multimedia messages, and

[computer readable program code means for causing the terminal to] define a selection criterion in said first message to limit information to be sent in response to said first message.

*20. A method comprising:*

*transmitting a first message wirelessly to a multimedia messaging centre, the first message requesting the multimedia messaging centre to transmit a notification message to a terminal only for multimedia messages addressed to the terminal for which a notification message has not been sent, and only for multimedia messages for which a notification message has been sent and an acknowledgement message from the terminal has not yet been received by the multimedia messaging center, wherein said first message comprises an option to define a selection criterion so as to limit information to be sent in response to said first message; and*

*receiving the notification message at the terminal, wherein the notification message is a message to which a response is to be sent from the terminal for receiving the actual multimedia message.*

* * * * *